United States Patent
Pavan et al.

(10) Patent No.: US 8,484,454 B2
(45) Date of Patent: Jul. 9, 2013

(54) SECURE OFFLINE RELOCATION OF PORTABLE SOFTWARE LICENSES

(75) Inventors: David John Pavan, Calgary (CA); Samuel Grosvenor Norris, Victoria (GB); Christopher Daniel Elliott, Calgary (CA)

(73) Assignee: Honeywell ASCA Inc., Mississauga, Ontario (CA)

( * ) Notice: Subject to any disclaimer, the term of this patent is extended or adjusted under 35 U.S.C. 154(b) by 365 days.

(21) Appl. No.: 12/838,891

(22) Filed: Jul. 19, 2010

(65) Prior Publication Data

US 2011/0093695 A1    Apr. 21, 2011

Related U.S. Application Data

(60) Provisional application No. 61/235,033, filed on Aug. 19, 2009.

(51) Int. Cl.
   *H04L 29/00*    (2006.01)

(52) U.S. Cl.
   USPC ........... 713/150; 713/151; 713/152; 709/225; 709/226; 709/229

(58) Field of Classification Search
   None
   See application file for complete search history.

(56) References Cited

U.S. PATENT DOCUMENTS

| | | | |
|---|---|---|---|
| 2005/0268115 A1* | 12/2005 | Barde et al. | 713/189 |
| 2007/0136205 A1 | 6/2007 | Przybilla | |
| 2008/0244751 A1* | 10/2008 | Peinado | 726/26 |
| 2009/0006261 A1 | 1/2009 | Bernstein et al. | |
| 2009/0210923 A1* | 8/2009 | Jogand-Coulomb | 726/1 |

* cited by examiner

*Primary Examiner* — Ghazal Shehni
(74) *Attorney, Agent, or Firm* — Jetter & Associates, P.A.

(57) ABSTRACT

A method for the secure offline relocation of portable software licenses. The portable software license has an associated time limit. A license relocation record can be generated including the portable software license and limit information for the time limit for relocation to a second computing device operating in an offline state. The license relocation record is temporarily securely stored on a removable security device attached to a first computing device that is connected to a licensing network. The removable security device can be disconnected from the first computing device and subsequently connected to the second computing device. Provided the time limit is not exceeded, the portable software license can then be installed upon the second computing device. Upon successful installation of the portable software licenses, the license relocation record can be removed from the removable security device.

12 Claims, 4 Drawing Sheets

SECURE OFFLINE RELOCATION OF PORTABLE SOFTWARE LICENSES

CROSS REFERENCE TO RELATED APPLICATIONS

This application and the subject matter disclosed herein claims the benefit of Provisional Application Ser. No. 61/235,033 entitled "SECURE OFFLINE RELOCATION OF PORTABLE SOFTWARE LICENSE FILES", filed Aug. 19, 2009, which is herein incorporated by reference in its entirety.

FIELD

Disclosed embodiments relate to software license management and, more particularly, to the secure offline relocation of software licenses.

BACKGROUND

Software license management is an essential service to ensure the legitimate usage and distribution of a software product. In general, software licenses are either directly installed upon a computing device or provided to the computing device over a network from a centralized source, commonly referred to as a network license server 185 as shown in system 100 of FIG. 1A (Prior Art).

The node associated with the network license server 185 (license node) includes a data store 130 that includes license management software 125 and portable licenses 135 that are associated with at least one software application. Network license server 185 (license node) provides the license management software 125 to client device 110 or the client device 125 comes preloaded with the license management software 125 which enables the transfer of a copy of the portable license 135 to local data store 115 of the client device 110 in the form of relocated licenses 120. The license management software 125 running on client device 110 is responsible for tracking timeouts of the relocated licenses 120. Such network-based relocated licenses 120 are only valid while the client device 110 is connected to the network license server 185 via the network 140, and are only valid for the applicable license period.

Users 105 of a portable client device 110, such as a laptop computer or a personal data assistants (PDAs), must locally install or be provided with applicable licensing information in order to continue using licensed software when disconnected from the network 140. Typically, a relocated license 120 is valid for only a specified license period (e.g., 1 year). Often times, the license period of the relocated license 120 expires when the user 105 is physically remote (i.e., disconnected) from the licensing network 140. This causes the related software applications to cease functioning until the user 105 is able to reconnect the client device 110 to the network 140 to renew the relocated license 120.

An alternate known approach that can provide licensing information to a remote (offline) computing device is shown in system 150 of FIG. 1B (Prior Art). In system 150, a hardware device including memory referred to as a dongle 165 contains one or more permanent licenses 175 in its data store 170. The client device 160 includes pre-loaded license management software 125 that is responsible for tracking timeouts of the permanent licenses 175. When the dongle 165 is connected to the client device 160, the user 155 is provided access to the related software applications provided by permanent licenses 175 without the need for connection to a licensing network, such as network 140 shown in FIG. 1A.

Dongle 165 is a typically proprietary devices and are not widely used for common software products due to the extra cost of hardware and software configuration. While each of these approaches may satisfy a specific niche, neither approach allows a portable license to be securely relocated from a network license server to a remotely located computing device that is disconnected from the network license server. For example, a problem is presented when a commuted license expires while a user is in the field and is thus unable to re-commute because they are unable to connect to the business network.

SUMMARY

Disclosed embodiments include methods for the secure offline relocation of portable software licenses to offline devices that solves problems including the problems presented when a commuted license expires while a user is in the field and unable to re-commute because they are unable to connect to the business network needed to reach the licensing network. The network license server, the online client device (generally referred to as the first client or first computing device), and the offline client device (generally referred to herein as the second client or second computing device) have pre-installed license management software analogous to license management software 125 described above. The network license server or the first client device includes a pre-installed license relocation handler (software), and the second client device includes a pre-installed license relocation handler. License relocation handler software adds new functionality that is beyond the functionality provided by the license management software.

Specifically, licensing data for the software licenses can be aggregated in a license relocation record created by the license relocation handler. The licensing data comprises one or more relocated license(s), the time limit information and maximum usage of the license(s) in the license relocation record. The license management software running on each device is responsible for enforcing those limits when users acquire licenses. Thus, the license relocation record contains the time limit information, and the license management software enforces the limits.

The license relocation record that is generated by the license relocation handler is first transferred to a removable memory comprising security device (e.g. a dongle) coupled to the first computing device that acts as an intermediate, and then the relocated license(s) are transferred from the removable memory comprising security device (e.g. a dongle) as a relocated license to the second computing device to complete the transaction. The license relocation record can authorize access to the software applications locally available upon the second computing device for a predefined time limit. The license relocation record can then be securely stored in a memory store of a removable security device.

Another aspect of this Disclosure is a system for the secure offline relocation of portable software licenses. Such a system includes a network license server that includes license management software and portable licenses, a network, a first online computing device having license management software, a second offline computing device, a license relocation handler at the license server or the first computing device, and a removable security device. The second computing device includes pre-installed license management software and a portable license relocation handler. Licensing data for the software licenses including the portable license and limit information for the time limit is aggregated in a license relocation record created by the license relocation handler. The removable security device having the license relocation record is operable to act as an intermediate and transfer its license relocation record including the portable license to the second computing device.

DETAILED DESCRIPTION

Figure 1A:
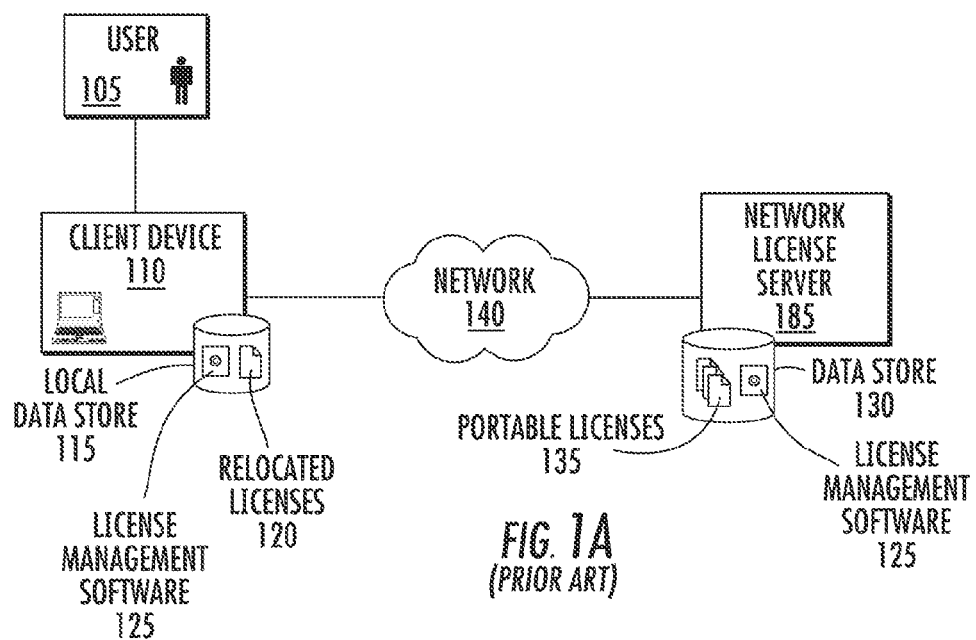
FIG. 1A is a schematic diagram illustrating a conventional system that relocates portable licenses from a network license server to a user's client device via a network.
Figure 1B:
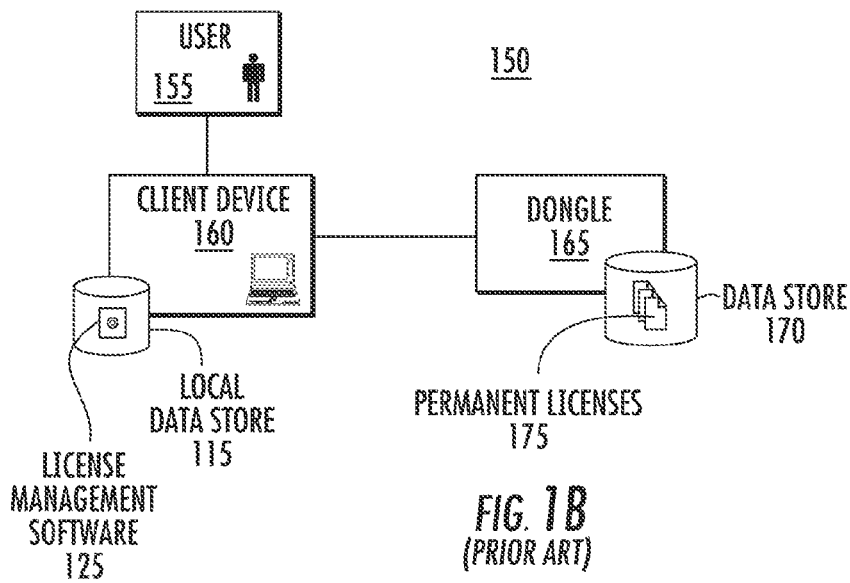
FIG. 1B is a schematic diagram illustrating a conventional system that utilizes a dongle to provide portable licenses to a user's client device for offline use.

Disclosed embodiments in this Disclosure are described with reference to the attached figures, wherein like reference numerals are used throughout the figures to designate similar or equivalent elements. The figures are not drawn to scale and they are provided merely to illustrate the disclosed embodiments. Several aspects are described below with reference to example applications for illustration. It should be understood that numerous specific details, relationships, and methods are set forth to provide a full understanding of the disclosed embodiments. One having ordinary skill in the relevant art, however, will readily recognize that the subject matter disclosed herein can be practiced without one or more of the specific details or with other methods. In other instances, well-known structures or operations are not shown in detail to avoid obscuring structures or operations that are not well-known. This Disclosure is not limited by the illustrated ordering of acts or events, as some acts may occur in different orders and/or concurrently with other acts or events. Furthermore, not all illustrated acts or events are required to implement a methodology in accordance with this Disclosure.

This Disclosure allows for the secure relocation of portable software licenses to computing devices not connected to a donor network, such as licensing network comprising a network license server node that include software licenses. One or more software licenses can be checked-out from the licensing network and temporarily stored as a license relocation record on a removable security device (e.g., dongle) that is connected to a computing device on the licensing network. The removable security device can then be disconnected from the computing device and physically transported to a second computing device that is not connected to the licensing network. Upon connection to the second computing device, a license relocation handler operating on the second computing device can read the license relocation record and allow installation of the software licenses onto the second computing device while offline from the licensing network, and then remove (i.e., destroy) the license relocation record on the removable security device.

Figure 2A:
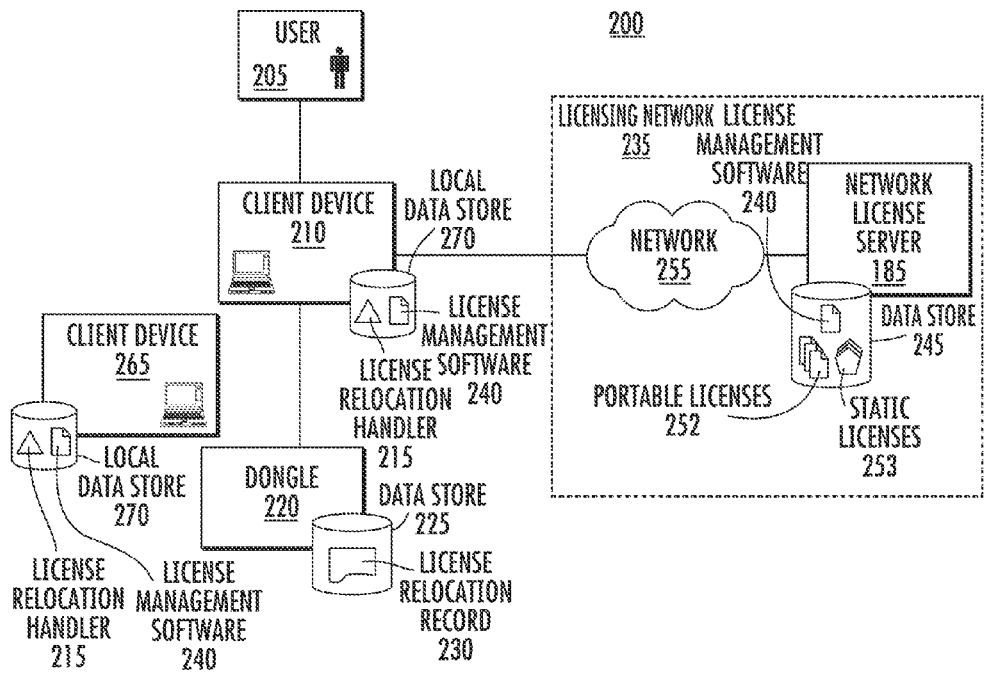
FIG. 2A is a schematic diagram illustrating a system including a removable security device (e.g., dongle) having a license relocation record that can provide the secure offline relocation of portable licenses to an offline client device, according to an embodiment of the invention.

FIG. 2A is a schematic diagram illustrating a system 200 including a removable memory comprising security device 220 (e.g. dongle) having a license relocation record 230 that can provide secure offline relocation of portable licenses 252 to offline client device 265, according to an embodiment of the invention. In system 200, a user 205 can temporarily store portable licenses 252 obtained from a licensing network 235 comprising a network license server 185 to a removable security device 220 shown as dongle 220 for later relocation to client device 265 that is not connected to the licensing network 235.

As used herein, the term "dongle" refers to a portable hardware security device having memory whose connection to a computing device provides access to a target software application or features of a target software application. For example, many STEINBERG audio software applications require a dongle 220 called a STEINBERG Key, for operation. Without the dongle 220, a user 205 cannot access the target software application or feature.

As used herein, the term "license" or "license software" as in "portable license" or "portable license software" is used to generically refer to a collection of verifiable customer entitlement information together with at least one software application. A license need not equate to a computer file.

The licensing network 235 can represent a collection of various computing devices that can be communicably linked to other devices via a network 255. The licensing network 235 includes license management software 240 stored in data store 245. License management software 240 is also installed at client device 210, shown stored in local data store 270. License management software 240 thus runs at both the network license server 185 and the client device 210.

Network 255 can include any hardware/software/and firmware necessary to convey data encoded within carrier waves. Data can be contained within analog or digital signals and conveyed though data or voice channels. Network 255 can include local components and data pathways necessary for communications to be exchanged among computing device components and between integrated device components and peripheral devices. Network 255 can also include network equipment, such as routers, data lines, hubs, and intermediary servers which together form a data network, such as the Internet. Network 255 can also include circuit-based communication components and mobile communication components, such as telephony switches, modems, cellular communication towers, and the like. Network 255 can include line based and/or wireless communication pathways.

The data store 245 associated with network license server 185 includes license management software 240, as well as static licenses 253 and portable licenses 252. Static licenses 253 can represent software licensing information that is only valid while a client device 210 is connected to the licensing network 235. A portable license 252 can represent software licensing information provided to a client device 210 to provide access to software applications when the client device 210 is disconnected from the licensing network 235. Typically, a portable license 252 can be borrowed by a user from the licensing network 235 for a fee for predefined amount of time, after which, the associated software applications cease to function.

To configure system 200, the user 205 can connect the dongle 220 to a client device 210 that is connected to the licensing network 235 via network 255. The user 205 can then utilize the license relocation handler software 215 shown in FIG. 2A running on the client device 210 to initiate relocation of a portable license 252 in a first step from the licensing network 235 to the dongle 220. The client device 210 can represent a variety of computing devices capable of supporting operation of the license relocation handler 215 and connecting to both the licensing network 235 and the dongle 220, such as a personal computer (PC).

The license relocation handler 215 is generally a software application configured to mediate the relocation of the portable license 252 from the network license server 185 to the dongle 220. Although license relocation handler 215 is shown running on the client device 210 in FIG. 2A, the license relocation handler 215 can in another embodiment be a component of the licensing network 235 that is operated from the client device 210 (see FIG. 2C described below).

The license relocation handler 215 can generate a license relocation record 230 that is stored on the dongle 220. As described above the license relocation record 230 can represent, in part or in whole, the portable software license application and licensing information for the portable license 252. For example, the license relocation record 230 can include one or more portable licenses 252 in their entirety and another file containing time limit and/or usage information. Alternately, the license relocation record 230 can contain a portable license 252 that has been modified by the license management software 240 to include time limit and/or usage information.

The license relocation handler 215 can be further configured to encrypt the license relocation record 230 prior to storage on the dongle 220. The dongle 220 has a data store 225 containing the license relocation record 230 generated by the license relocation handler 215. An example of a dongle 220 can be a universal serial bus (USB) memory stick that is configured with specific security handshaking protocols and/or software code that enables operation of the software application or feature. Dongles such as dongle 220 have security mechanisms that prevent the portable license(s) being duplicated or copied by any software other than license management software 240. Once the license relocation record 230 is generated and stored on the dongle 220, the user 205 can disconnect the dongle 220 from the client device 210. The dongle 220 can then be physically transported and connected to client device 265 that is remote (offline) from a licensing network 235, with this connection providing transfer of the portable license(s) to the client device 265.

In one embodiment the dongle 220 is a proprietary licensing dongle that comprises a read-only memory store configured to store at least one branded software license, wherein contents of said read-only memory store are unable to be modified by the license relocation handler, and a read-writable memory store configured to allow execution of data transactions by said license relocation handler, wherein the data transactions comprise at least one action from a group of actions consisting of a read action, a write action, a modify action, and a remove action.

Figure 2B:
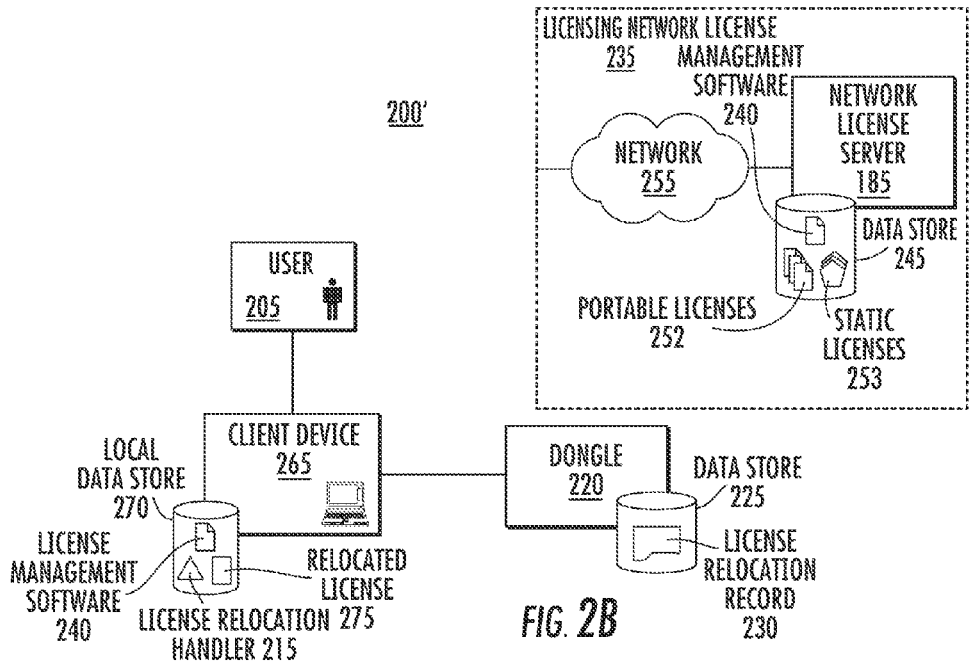
FIG. 2B is schematic diagram illustrating the system shown in FIG. 2A at a later time that has the removable security device (e.g., dongle) including the license relocation record now connected to the offline client device, according to an embodiment of the invention.

FIG. 2B is schematic diagram illustrating system 200 shown at a later time designated as system 200' that has the dongle 220 including the license relocation record 230 now shown connected to the offline client device 265. Client device 265 includes a preloaded license relocation handler 215 and license management software 240.

Upon connection of the dongle 220 to the client device 265, the license relocation handler 215 can identify that the dongle 220 contains the license relocation record 230. The license relocation handler 215 can then prompt the user 205 in a dialogue to install the portable software licenses contained within the license relocation record 230 on the dongle 220, provided time is remaining for the predetermined time limit, with the license relocation record 230 containing the time information, and with the license management software 240 enforcing the limits (i.e. tracking timeouts of local licenses and relocated licenses). Installation of the dongle 220 to the client device 265 can result in the relocated license 275 being transferred to and stored in the local data store 270 of the client device 265. After installation to the client device 265, the license relocation handler 215 can automatically remove the license relocation record 230 from the dongle 220. It should be noted that the client device 265 to which the relocated license 275 is installed is installed at a time when needed, not at the time when the license relocation record 230 is generated. This allows flexibility for relocating the portable license 252. For example, this approach can allow for a portable license 252 to be shared between customers of the same software application, which is a feature not supported by conventional approaches.

Additionally, use of a dongle 220 in this approach can minimize transportation of portable client devices 265. For example, a support technician need only take a dongle 220 to a customer site in the field instead of needing to take a client device 265, such as a laptop computer.

Figure 2C:
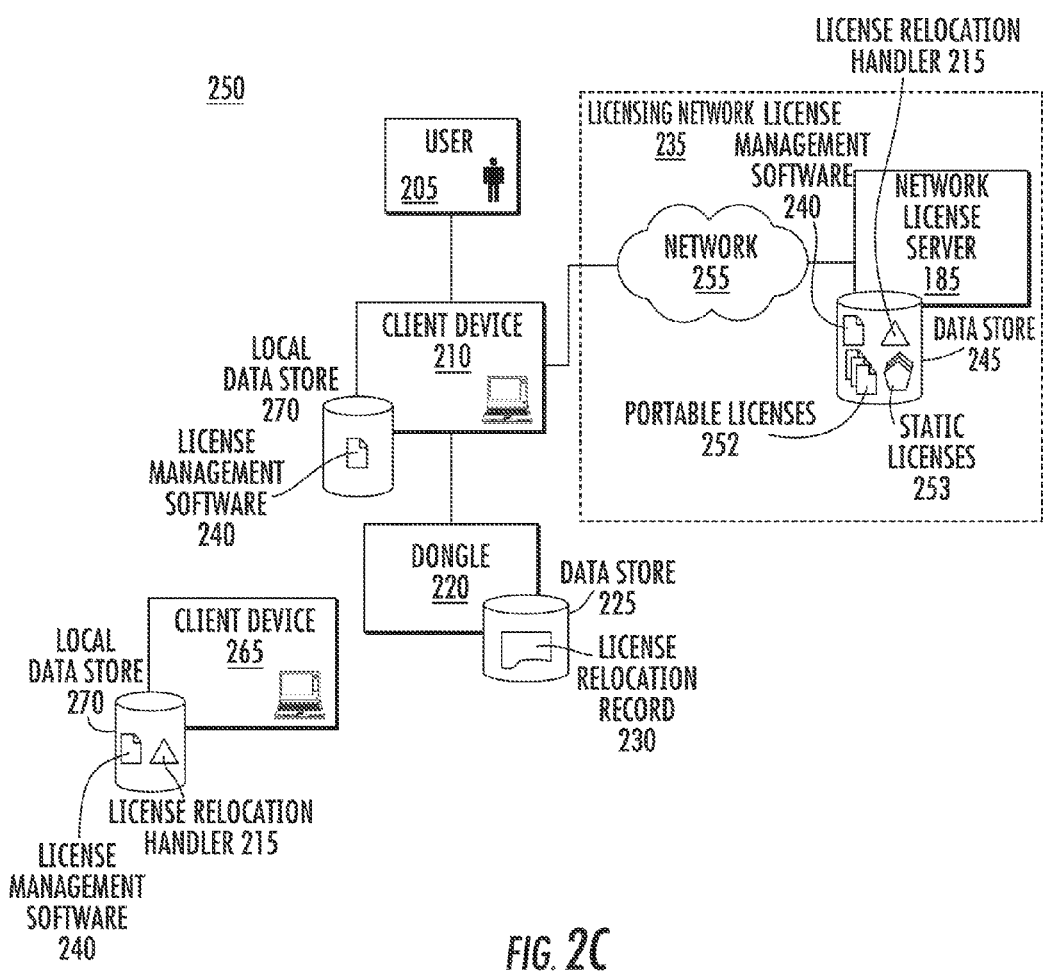
FIG. 2C is a schematic diagram illustrating a system including a removable security device (e.g., dongle) having a license relocation record that provides the secure offline relocation of portable licenses, according to another embodiment of the invention.

FIG. 2C is a schematic diagram illustrating a system 250 that provides the secure offline relocation of portable licenses according to another embodiment of the invention. In system 250 the license relocation handler 215 is now a component of the licensing network 235 that operates from the client device 210 over network 255.

As used herein, data stores 225, 245, and 270 can be a physical or virtual storage space configured to store digital information. Data stores 225, 245, and 270 can be physically implemented within any type of hardware including, but not limited to, a magnetic disk, an optical disk, a semiconductor memory, a digitally encoded plastic memory, a holographic memory, or any other recording medium. Data stores 225, 245, and 270 can be a stand-alone storage unit as well as a storage unit formed from a plurality of physical devices. Additionally, information can be stored within data stores 225, 245, and 270 in a variety of manners. For example, information can be stored within a database structure or can be stored within one or more files of a file storage system, where each file may or may not be indexed for information searching purposes. Further, data stores 225, 245, and 270 can utilize one or more encryption mechanisms to protect stored information from unauthorized access.

Figure 3:
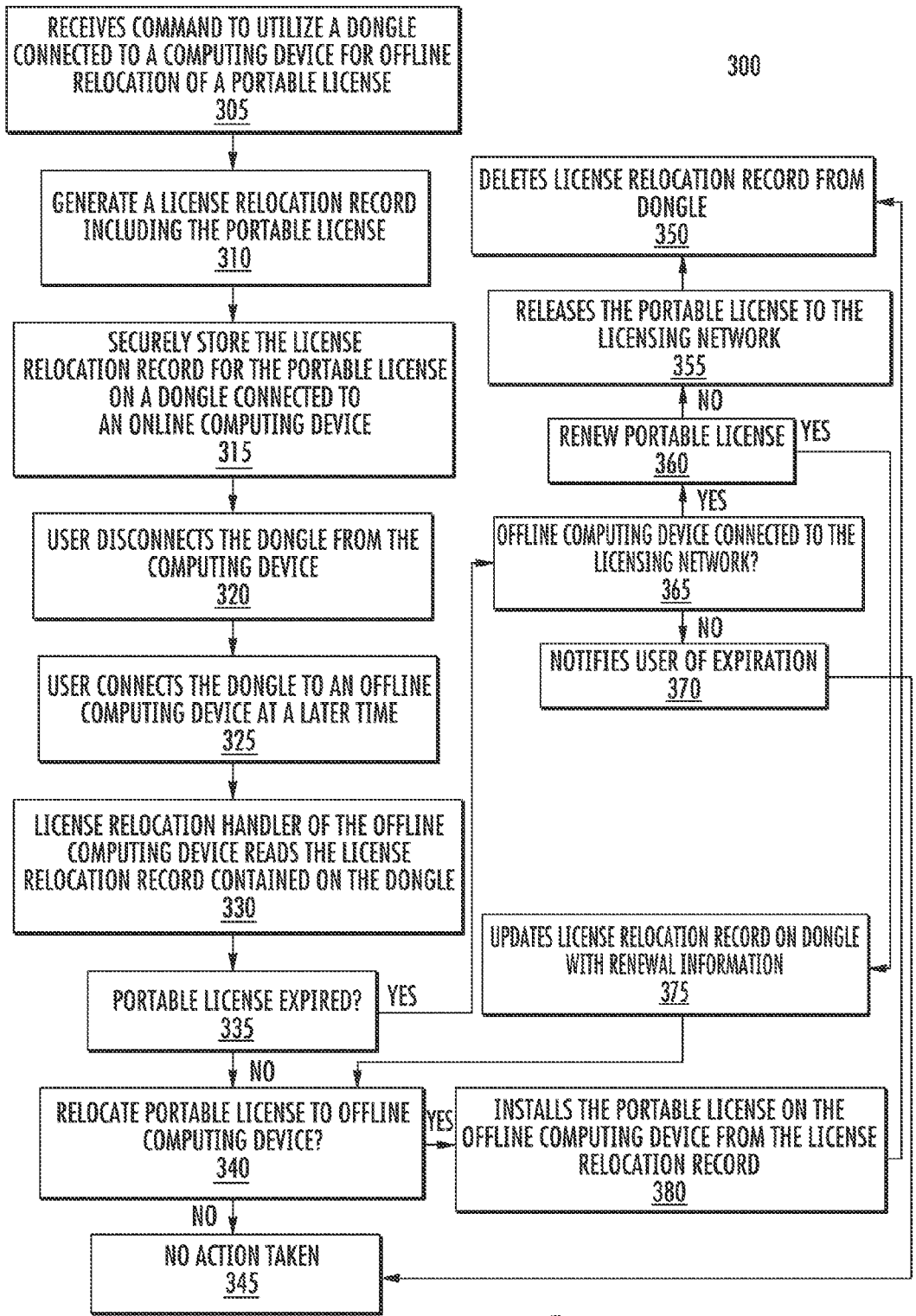
FIG. 3 is a flowchart describing a method for the secure offline relocation of portable licenses, according to an embodiment of the invention.

FIG. 3 is a flowchart describing a method 300 for the secure offline relocation of portable licenses according to an embodiment of the invention. Method 300 can be performed within the context of systems 200 and 250.

Method 300 can begin in step 305 where a license relocation handler can receive a command to utilize a dongle connected to an computing device (e.g., a PC). A license relocation transaction for the portable license can be generated comprising at least one portable license by a license relocation handler that is at the network license server or the inline computing device in step 310.

In step 315, the license relocation record can be securely stored on the dongle while connected to the online computing device. The user can then disconnect the dongle from the computing device in step 320. In step 325, the user can connect the dongle to an offline computing device (e.g., laptop computer) at some later time.

The license relocation handler at the offline computing device can read the license relocation record from the dongle in step 330. In step 335, the license relocation handler can determine if the time limit for the portable license of the license relocation record has expired.

When the portable license has not expired, the user can be asked during a user dialog if the portable license is to be relocated to the offline client device in step 340. If the user does not want to relocate the portable license, then no action is taken in step 345.

If the portable license is to be relocated, step 380 can execute where the license relocation handler initiates the installation of the portable license on the offline computing device from the license relocation record. After installation, the flow can proceed to step 350 where the license relocation record can be deleted from the dongle.

When the portable license has expired, the flow can proceed to step 365 where it can be determined if the offline computing device is connected to the licensing network. If the offline client device is not connected to the licensing network, the user can be notified of the expiration in step 370. From step 370, flow can proceed to step 345 where no action is taken.

When the offline computing device is connected to the licensing network, step 360 can execute where the user can be asked if the portable license should be renewed. When the portable license is not to be renewed, the portable license can be released to the license management system in step 355. Once the portable license is released, step 350 can execute where the license relocation record is deleted from the dongle. The dongle may be reused for new (later) license relocation transactions.

When the portable license is to be renewed, step 375 can execute where the license relocation record on the dongle can be updated with the renewal information. From step 375 flow can proceed to step 340 to determine relocation of the portable license.

The schematic diagrams in FIGS. 2A-C and 3 illustrate the architecture, functionality, and operation of possible implementations of systems, methods, and computer program products according to various embodiments of the disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The disclosure may be embodied as a method, system, or computer program product. Accordingly, the disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the disclosure may take the form of a computer program product on a computer-usable storage medium having computer-usable program code embodied in the medium. In a preferred embodiment, the disclosure is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device. Any suitable computer usable or computer readable medium may be utilized. The computer-usable or computer-readable medium may be, for example but not limited to, an electronic, magnetic, optical, electromagnetic, infrared, or semiconductor system, apparatus, or device. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD.

Computer program code for carrying out operations of the disclosure may be written in an object-oriented programming language such as Java, Smalltalk, C++ or the like. However, the computer program code for carrying out operations of the disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The terminology used herein is for the purpose of describing particular embodiments only and is not intended to be limiting to this Disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the disclosure has been presented for purposes of illustration and description, but is not intended to be exhaustive or limited to the form disclosed. Many modifications and variations will be apparent to those of ordinary skill in the art without departing from the scope and spirit of this Disclosure.

We claim:

1. A method for relocation of portable software licenses to offline computing devices, comprising:
   providing a licensing network comprising a network license server including at least one portable software license that includes an associated time limit for its use comprising at least one software application and a first computing device connected to said licensing network having a removable security device including a memory store connected thereto;
   relocating said portable software license from said licensing network to said memory store of said removable security device to generate a license relocation record on said removable security device, said license relocation record including limit information for said time limit;
   detaching said removable security device from said first computing device;
   connecting said removable security device to a second computing device that is not connected to said licensing network;
   provided said time limit is not exceeded, transferring said portable software license to said second computing device, and
   following said transferring of said portable software license to said second computing device, removing said license relocation record from said memory store of said removable security device.

2. The method of claim 1, wherein said license relocation record is generated by said licensing network.

3. The method of claim 1, wherein said license relocation record is generated by said first computing device.

4. The method of claim 1, wherein said license relocation record comprises an encrypted license relocation record.

5. The method of claim 4, wherein said transferring said portable software license to said second computing further comprises decrypting said encrypted license relocation record.

6. The method of claim 1, wherein provided said time limit is not exceeded:
   accessing said license relocation record; and
   determining an activity status for said license relocation record, wherein said the activity status comprises an active status or an expired status;
   wherein when said activity status is determined as said active status, permitting said transferring of said software license to said second computing device; and
   wherein when said activity status of said license relocation record is determined as said expired status, prohibiting said transferring of said software license to said second computing device.

7. The method of claim 6, wherein said activity status is said expired status and said prohibiting transferring said software license further comprises:
   ascertaining an accessibility of said licensing network from said second computing device;
   when said licensing network is available to said second computing device, establishing communication with said licensing network;
   said licensing network providing a user of said second computing device an option to renew said software license;
   in response to said user renewing said software license, transferring said software license to said second computing device.

8. A system for the secure offline relocation of portable software licenses to offline computing devices, comprising:
   a licensing network comprising a network license server having at least one portable license associated with at least one software application and license management software, wherein said portable license includes an associated time limit for its use that is enforced by said license management software;
   a first computing device connected to said licensing network having said license management software;
   a second computing device having said license management software disconnected from said licensing network;
   a license relocation handler configured to manage relocation of said portable software license from said licensing network to said second computing device at said licensing network or at said first computing device, wherein licensing data for said portable software license including said portable license and limit information for said time limit is aggregated in a license relocation record created by said license relocation handler; and
   a removable security device configured to store said license relocation record for later transfer to said second computing device, wherein said removable security device is capable of being connected to the first computing device and said second computing device, and wherein said removable security device comprises at least one non-volatile memory element.

9. The system of claim 8, wherein said license relocation handler is a component of said licensing network.

10. The system of claim 8, wherein said license relocation handler is a component of said first computing device.

11. The system of claim 8, wherein said license relocation handler is operable to encrypt said license relocation record.

12. The system of claim 8, wherein, when said removable security device is a proprietary licensing dongle, wherein said removable security device further comprises:
   a read-only memory store configured to store at least one branded software license, wherein contents of said read-only memory store are unable to be modified by said license relocation handler, and
   a read-writable memory store configured to allow execution of data transactions by said license relocation handler, wherein said data transactions comprise at least one action from a group of actions consisting of a read action, a write action, a modify action, and a remove action.

* * * * *

UNITED STATES PATENT AND TRADEMARK OFFICE
CERTIFICATE OF CORRECTION

PATENT NO. : 8,484,454 B2  
APPLICATION NO. : 12/838891  
DATED : July 9, 2013  
INVENTOR(S) : David John Pavan, Samuel Grosvenor Norris and Christopher Daniel Elliott Page 1 of 1

It is certified that error appears in the above-identified patent and that said Letters Patent is hereby corrected as shown below:

On the Title Page

In Item (75) Inventors (left column), please correct the citizenship of Inventor Samuel Grosvenor Norris so that the Inventors read as follows:

David John Pavan, Calgary (CA); Samuel Grosvenor Norris, Victoria (CA); Christopher Daniel Elliott, Calgary (CA)

Signed and Sealed this
Thirteenth Day of August, 2013

Teresa Stanek Rea
*Acting Director of the United States Patent and Trademark Office*